Feb. 13, 1940.   D. I. MILLER   2,190,503
PRUNING SHEARS
Filed Oct. 17, 1938
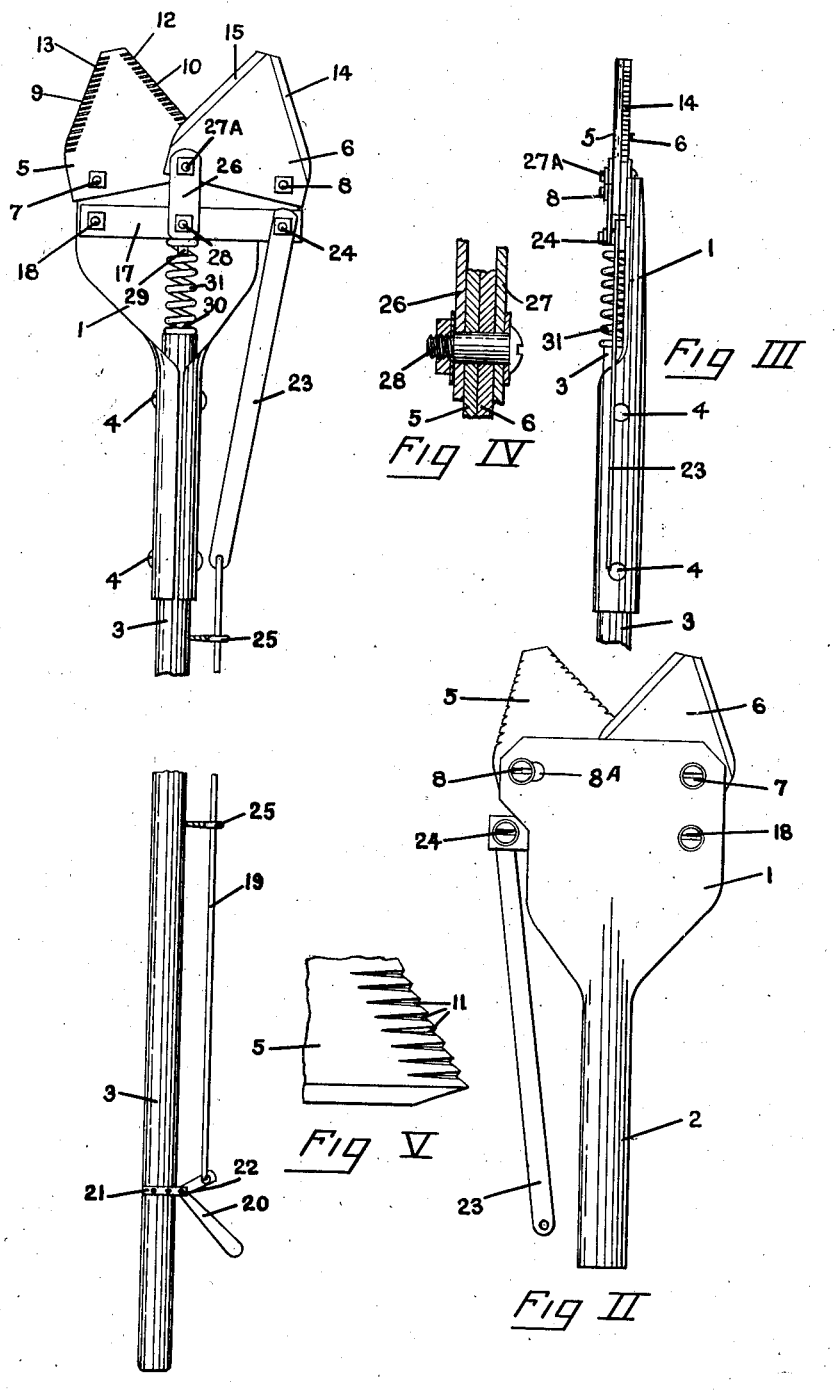
INVENTOR
David I. Miller
BY
ATTORNEY Patented Feb. 13, 1940

2,190,503

UNITED STATES PATENT OFFICE 2,190,503

PRUNING SHEARS

David I. Miller, Albany, Oreg.

Application October 17, 1938, Serial No. 235,322

3 Claims. (Cl. 30—237)

My invention relates to pruning shears. The invention is primarily intended for use in the trimming of trees, shrubs and the like.

The invention is comprised of a head adapted for being supported upon any suitable staff or pole. The head is made of one piece, and a pair of shearing blades are hingedly secured to the head and are hingedly secured together. One of the blades has a serrated edge. An actuating bar is hingedly secured on one of its ends to the head and in normal spaced relation with the base end of the shearing blade.

A pull rod runs longitudinally of the handle and is in communication with the actuating bar by a link and a pair of actuating links are hingedly secured to the actuating bar and to the shearing blades, and a reactance means as a coil spring normally maintains the shearing blades in open relationship to admit a limb to be cut for entering between the shearing blades.

Heretofore it has been the general custom in devices of this kind to provide a single cutting blade that is moved into cutting relationship with a hook head. This construction many times caused the cutting edge of the blade to contact the hooked head which had a tendency to lessen the cutting efficiency of the blade and to place the material being cut in single shear.

Through the use of my new and improved device, a double shearing action is accomplished and with one of the blades being serrated at its cutting edge, the limb or other article to be cut is held firmly and it has no tendency to be moved out of cutting position due to the shearing action. I accomplish these results by the mechanism in the accompanying drawing.

In the drawing:

Fig. I is a fragmentary front view of the assembled device in normal position with the blades extended in a normal open position.

Fig. II is a rear view of the head assembly and of the cutting blades secured thereto.

Fig. III is a side view of the mechanism illustrating Fig. II.

Fig. IV is a fragmentary sectional side view of the shearing blades at the location where the links are connected to the same to form an articulating relationship between the actuating bar and the shear blades.

Fig. V is a fragmentary front view of the shear blade having serrated edges.

Like reference characters refer to like parts throughout the several views.

I form my device of a head 1 made of suitable sheet metal. A handle engaging shank 2 is disposed at the base end of the head, and a handle 3 is inserted therein and is secured thereto by suitable rivets 4.

A pair of shearing blades 5 and 6 are hingedly secured to the head through the use of bolts 7 and 8. In Fig. II an elongated slot 8A is shown in the head 1 and as the blades 5 and 6 are moved into and out of cutting position, the bolt 8 is reciprocated transversely of the elongated slot 8A. The shearing blade 5 has serrated edges 9 and 10. The serrated edges are sharpened and form a notched edge as illustrated at 11 in Fig. V. This notched edge prevents the slippage on material being cut and the two blades are brought into shearing action in the article to be cut and prevents the same moving out of cutting position.

Both of the blades 5 and 6 have cutting edges upon their opposite sides as illustrated at 12 and 13, 14 and 15 so that when one of the pairs of edges becomes dulled they are moved into the opposite position to thereby place the sharp edges of the respective blades in cutting position.

An actuating bar 17 is hingedly secured to the head 1 by any suitable hinging connection as by a bolt 18. A pull rod 19 runs longitudinally of the handle and the pull rod is connected to a bell crank handle 20. The handle 20 is secured to the handle 3 by any suitable supporting bracket 21, the same being hinged about a connecting pin 22. The oppositely disposed end of the pull rod 19 is secured to a connecting link 23. The connecting link 23 is disposed between the pull rod 19 and the actuating bar 17.

The link 23 is secured to the actuating bar 17 by any suitable hinging connection as by the use of a bolt 24. The pull rod is held in position and alignment relative to the handle 3 and to any suitable means as by screw eyes 25.

Articulation is developed between the actuating bar 17 and the shearing blades through the use of a pair of links 26 and 27 that are disposed upon the opposite sides of the shearing blades 5 and 6 through the use of a bolt 27A, and they are secured to the actuating bar 17 through the use of a bolt 28.

A teat 29 runs down from the bottom end of one of the links 26 and a pin 30 upwardly extends from the head end of the handle 3, and a reactance spring 31 is seated upon the handle 3 and the actuating bar 17 by the respective teat 29 and the pin 30 to thereby normally maintain the shear blades in normal receiving position and the handle 20 in actuating position.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claims which follow:

What I claim is:

1. In a device of the class described, the combination of a head made of a single piece and having a shank formed integral therewith and outwardly extending therefrom, a handle disposed within the shank and disposed coaxial therewith, a pin disposed within the head end of the handle, a pair of double edged shear blades hingedly secured to the head and secured in articulating relationship with each other, an actuating bar spaced apart from the shearing blades and hingedly secured to the head, a pull rod disposed longitudinally of the handle, a bell crank shaped handle hingedly secured to the handle and secured to the pull rod, means for maintaining the pull rod in parallel relationship with the handle, a link secured upon its one end to the pull rod and upon its oppositely disposed end to the actuating bar, a link connecting the actuating bar with the shear blades, a teat outwardly extending from one end of the said link and a coil spring seated upon the base end of the link to which the teat is disposed and upon the head end of the handle and held in registry by the teat associated with the link, and by the pin associated with the end of the handle.

2. In a device of the class described, the combination of a head, a handle removably disposed at one end of the head, a pair of shear blades one of which has a serrated cutting edge, hingedly secured to the head, an actuating bar hingedly secured to the head, a pair of articulating links communicating the actuating bar with each of the shear blades and a pull rod for manually actuating the shear blades and automatic means for maintaining the cutting edges of the shear blades spaced apart.

3. In a device of the class described, the combination of a head, a handle removably secured to the head and outwardly extending in one direction therefrom, a pair of shear blades hingedly secured to the head and adapted for coacting with each other, with the edge of one of the blades being serrated, an actuating bar, said bar being hinged to the head, means connecting the actuating bar with each of the shear blades, and a pull rod running longitudinally of the handle and in communication with the actuating bar on one of its ends and a bell crank handle for actuating the pull rod hingedly secured to the handle and to the pull rod and adapted for actuating the blades into and out of shearing position and said pull rod terminating adjacent the base end of the handle.

DAVID I. MILLER.